US011618005B2

(12) United States Patent
Sakikawa et al.

(10) Patent No.: US 11,618,005 B2
(45) Date of Patent: Apr. 4, 2023

(54) HYGROSCOPIC MATERIAL

(71) Applicants: SHARP KABUSHIKI KAISHA, Sakai (JP); THE SCHOOL CORPORATION KANSAI UNIVERSITY, Suita (JP)

(72) Inventors: Nobuki Sakikawa, Sakai (JP); Takashi Miyata, Suita (JP)

(73) Assignees: SHARP KABUSHIKI KAISHA, Sakai (JP); THE SCHOOL CORPORATION KANSAI UNIVERSITY, Suita (JP)

( * ) Notice: Subject to any disclaimer, the term of this patent is extended or adjusted under 35 U.S.C. 154(b) by 521 days.

(21) Appl. No.: 16/640,519

(22) PCT Filed: Jan. 22, 2018

(86) PCT No.: PCT/JP2018/001797
§ 371 (c)(1),
(2) Date: Feb. 20, 2020

(87) PCT Pub. No.: WO2019/043979
PCT Pub. Date: Mar. 7, 2019

(65) Prior Publication Data
US 2020/0171461 A1 Jun. 4, 2020

(30) Foreign Application Priority Data
Sep. 1, 2017 (JP) .............................. JP2017-168510

(51) Int. Cl.
| B01J 20/24 | (2006.01) |
| B01D 53/26 | (2006.01) |
| B01D 53/28 | (2006.01) |
| C09K 5/14  | (2006.01) |

(52) U.S. Cl.
CPC ............ B01J 20/24 (2013.01); B01D 53/261 (2013.01); B01D 53/28 (2013.01); C09K 5/14 (2013.01); *B01D 2253/202* (2013.01)

(58) Field of Classification Search
CPC .................. B01D 53/261; B01D 53/28; B01D 2253/202; C09K 5/14; B01J 20/24
USPC ....................................................... 502/404
See application file for complete search history.

(56) References Cited

U.S. PATENT DOCUMENTS

| 4,594,860 | A  | 6/1986  | Coellner et al. |
| 5,147,420 | A  | 9/1992  | Claesson |
| 5,534,186 | A  | 7/1996  | Walker et al. |
| 6,526,674 | B1 | 3/2003  | Fielding et al. |
| 7,704,305 | B2 | 4/2010  | Nishida |
| 10,265,656 | B2 | 4/2019 | Sakikawa et al. |
| 2009/0121196 | A1 | 5/2009 | El Bounia |
| 2011/0040007 | A1 | 2/2011 | Chandrasekhar et al. |
| 2013/0309927 | A1 | 11/2013 | Jangbarwala |
| 2017/0001492 | A1 | 1/2017 | Ito et al. |
| 2017/0065930 | A1 | 3/2017 | Sakikawa et al. |
| 2017/0266610 | A1 | 9/2017 | Sakikawa et al. |
| 2017/0276380 | A1 | 9/2017 | Sakikawa et al. |

FOREIGN PATENT DOCUMENTS

| JP | H06-055070 A | 3/1994 |
| JP | 2000-126540 A | 5/2000 |
| JP | 2000-142816 A | 5/2000 |
| JP | 2008-527064 A | 7/2008 |
| JP | 2009-189900 A | 8/2009 |
| JP | 2010-069428 A | 4/2010 |
| JP | 2011-038078 A | 2/2011 |
| JP | 2015-111629 A | 6/2015 |
| JP | 2016-077967 A | 5/2016 |
| JP | 2016-113651 A | 6/2016 |
| WO | 2015/083732 A1 | 6/2015 |
| WO | 2015/083733 A1 | 6/2015 |
| WO | 2016/035403 A1 | 3/2016 |
| WO | 2016/068129 A1 | 5/2016 |

OTHER PUBLICATIONS

Co-pending letter regarding a related co-pending U.S. Appl. No. 16/639,479.
Non-Final Office Action of U.S. Appl. No. 16/639,479 dated Jan. 18, 2022.

*Primary Examiner* — Edward M Johnson
(74) *Attorney, Agent, or Firm* — ScienBiziP, P.C.

(57) ABSTRACT

An excellent hygroscopic material containing a temperature responsive polymer, which can efficiently conduct heat, and hence has water release properties of absorbed water is realized. The hygroscopic material containing a polymer gel containing a temperature responsive polymer whose affinity with water reversibly changes in response to temperature stimulation and a thermally conductive filler is used.

5 Claims, 2 Drawing Sheets

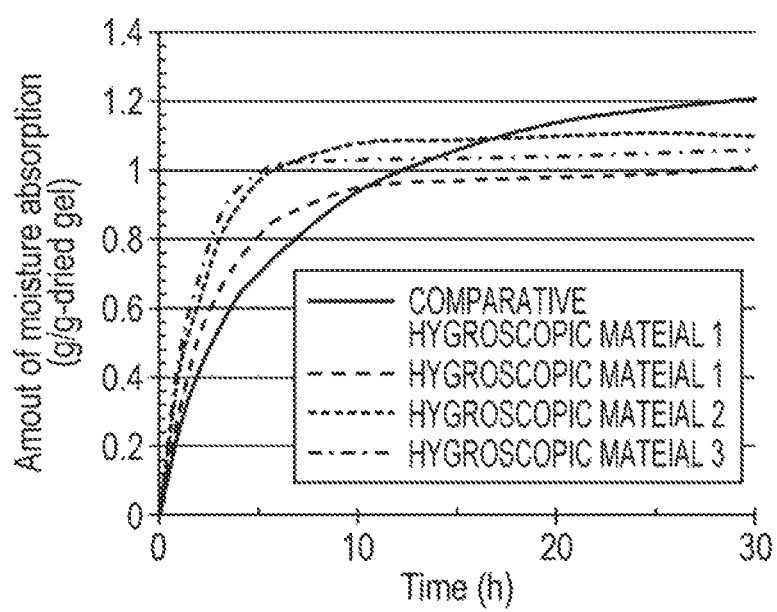

HYGROSCOPIC MATERIAL

TECHNICAL FIELD

The present invention relates to a hygroscopic material.

BACKGROUND ART

In the related art, a hygroscopic material containing a stimulus-responsive polymer has been Known as a material having hygroscopicity.

For example, PTL 1 discloses a composite porous fiber dehumidifying material. The composite porous fiber dehumidifying material is composed of a plurality of fibers having a reversible hydrogel material immobilized on the surface, and the reversible hydrogel material causes a phase change by stimulating a temperature change, a pH change, an electric field, a light intensity, a wavelength, or the like so as to release absorbed water.

CITATION LIST

Patent Literature

PTL 1: U.S. Patent Application Publication No. 2013/309927 (Published on Nov. 21, 2013)

Summary of Invention

Technical Problem

In the technique described in PTL 1, in a case where the reversible hydrogel material is a material that causes a phase change by stimulating a temperature change, the phase change of the reversible hydrogel material occurs by heating the reversible hydrogel material, and absorbed water is released. However, at this time, there is a problem in that the applied heat is not efficiently transferred into the reversible hydrogel material. As a result, the phase change did not efficiently occur, and thereby the absorbed water was not sufficiently released.

One aspect of the present invention is to realize an excellent hygroscopic material containing a temperature responsive polymer, which can efficiently conduct heat, and hence has water release properties of absorbed water.

Solution to Problem

In order to achieve the above object, a hygroscopic material according to one aspect to the present invention contains a polymer gel containing a temperature responsive polymer whose affinity with water reversibly changes in response to temperature stimulation and a thermally conductive filler.

Advantageous Effects of Invention

Since the hygroscopic material according to the aspect of the present invention is configured to contain a polymer gel containing a temperature responsive polymer whose affinity with water reversibly changes in response to temperature stimulation and a thermally conductive filler as described above, an effect of realizing an excellent hygroscopic material that can efficiently conduct heat and hence has water release properties of the absorbed water is exhibited.

BRIEF DESCRIPTION OF DRAWINGS

FIG. 4 is a diagram illustrating an evaluation result of a hygroscopic behavior of the hygroscopic material in examples of the present invention.

DESCRIPTION OF EMBODIMENTS

Figure 1:
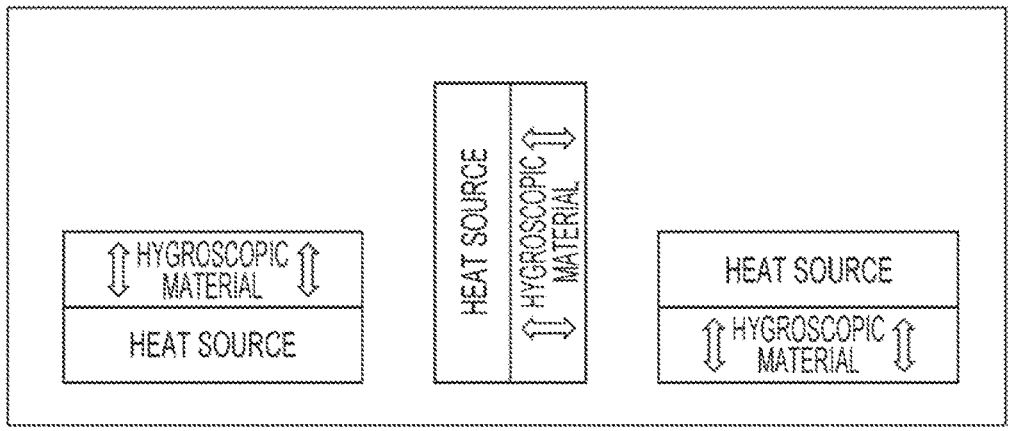
FIG. 1 is a diagram schematically illustrating orientation of a thermally conductive filler in a hygroscopic material according to one embodiment of the present invention.

Hereinafter, embodiments of the present invention will be described in detail. However, the present invention is not limited to these embodiments, various modifications can be made within the scope described above, and embodiments obtained by appropriately combining technical means disclosed in different embodiments are also included in the technical scope of the present invention. Note that, in the present specification, unless otherwise specified, "A to B" representing a numerical range means "A or more and B or less". In addition, "mass" and "weight" are considered synonymous. In addition, "(meth)acryl" is described in a case where both. "acryl" and "methacryl" are meant.

Embodiment 1: Hygroscopic Material

The inventors of the present invention have conducted intensive studies in view of the above circumstances, and as a result, surprisingly, it has been found for the first time that heat can be efficiently transferred while slightly reducing the hygroscopicity of the hygroscopic material by mixing a thermally conductive filler into a polymer gel containing a temperature responsive polymer whose affinity with water reversibly changes in response to temperature stimulation. In the related art, it has known to add a thermally conductive filler to a polymer material in order to improve the thermal conductivity of the polymer material. However, since the thermally conductive filler is hydrophobic, the hygroscopicity is deteriorated when added to the hygroscopic material. Therefore, the idea of adding the thermally conductive filler to the hygroscopic material has never been found. However, the inventors of the present invention have found that heat can be efficiently transferred into the hygroscopic material while slightly reducing the hygroscopicity of the hygroscopic material by mixing the thermally conductive filler into the polymer gel containing a temperature responsive polymer whose affinity with water reversibly changes in response to temperature stimulation. Furthermore, it has also been found that when the thermally conductive filler is mixed, the moisture absorption rate is improved. Based on this finding, the present invention has been completed.

That is, the hygroscopic material according to one embodiment of the present invention is configured to contain a polymer gel containing a temperature responsive polymer whose affinity with water reversibly changes in response to temperature stimulation and a thermally conductive filler.

(I) Thermally Conductive Filler

In the hygroscopic material according to one embodiment of the present invention, the thermally conductive filler is not particularly limited as long as it has higher thermal conductivity than that of the polymer gel, and usually can be used as a filler for improving thermal conductivity.

As the thermally conductive filler, it is possible to suitably use at least one thermally conductive filler selected from the group consisting of a carbonaceous material, a metal particle, a metal oxide, a metal hydroxide, a nitrogen compound, a carbon compound, ceramics, and cellulose. More specifically, examples of the thermally conductive filler can include a carbonaceous material such as carbon nanotube (CNT), carbon nanofiber (CNF), carbon nanohorn (CNH), carbon fiber, carbon black (CB), fullerene, graphite, and graphene; a metal particle such as gold, platinum, silver, copper, palladium, rhodium, iridium, nickel, iron, cobalt, bismuth, aluminum, stainless steel, and titanium; a metal oxide such as titanium oxide, aluminum oxide, magnesium oxide, zinc oxide, tin oxide, silicon oxide, beryllium oxide, zirconium oxide, copper oxide, and cuprous oxide; a metal hydroxide such as aluminum hydroxide, magnesium hydroxide, calcium hydroxide, chromium hydroxide, zirconium hydroxide, nickel hydroxide, and boron hydroxide; a nitrogen compound such as boron nitride, aluminum nitride, and silicon nitride; a carbon compound such as magnesium carbonate, calcium carbonate, barium carbonate, and silicon carbide; ceramics such as silica, talc, mica, kaolin, bentonite, and pyroferrite, cellulose, titanium boride, and calcium titanate. Examples of the metal particle include a metal nanoparticle, a metal microparticle, a metal nanorod, and a metal fiber. The thermally conductive filler may be used alone or two or more kinds thereof may be used in combination.

As the shape of the thermally conductive filler, those having various shapes can be used, for example, a plate shape, a columnar shape, a scale shape, a bar shape, a rod shape, a tube shape, a needle shape, a whisker shape, a fibrous shape, a spherical shape, an elliptical shape, and an indefinite shape. Among them, the thermally conductive filler is more preferably non-spherical. The thermally conductive filler can be oriented when being non-spherical. If the thermally conductive filler is oriented, heat can be more efficiently transferred into the hygroscopic material.

A volume average particle size of the thermally conductive filler is preferably 0.1 to 100 μm, and is more preferably 1 μm to 50 μm, from the viewpoint of being easily uniformly dispersed in the polymer gel. In addition, the thermally conductive fillers having different size or a shape may be used in combination. The volume average particle size of the thermally conductive filler is preferably 10 μm or more from the viewpoint that a high thermal conduction distance can be secured. Moreover, the volume average particle size of the thermally conductive filler is preferably 30 μm or less from the viewpoint of easy variance.

In addition, the aspect ratio of the thermally conductive filler is not particularly limited, and is preferably 2 to 1000, and is more preferably 10 to 100. Note that, the aspect ratio in the present specification means a ratio (length of major axis/length of minor axis) of the length of major axis of the thermally conductive filler to the length of minor axis of the thermally conductive filler. The closer the aspect ratio value is to 1, the closer the shape of the thermally conductive filler is to a true sphere. If the aspect ratio of the thermally conductive filler is 10 or more, it is preferable from the viewpoint of forming a thermal conduction path and being easily oriented in the hygroscopic material. Moreover, if the aspect ratio of the thermally conductive filler is 100 or less, it is preferable from the viewpoint of relatively easy dispersion and orientation.

An average length of the thermally conductive filler is more preferably 0.1 μm to 1000 μm, and still more preferably 1 μm to 100 μm. If the average length of the thermally conductive filler is 1 μm or more, it is preferable from the viewpoint of advantageous thermal conduction. Moreover, if the average length of the thermally conductive filler is 100 μm or less, it is preferable from the viewpoint that a function as a hygroscopic material is comparatively easy to maintain.

The volume average particle size, the aspect ratio, and the average length of the thermally conductive filler can be calculated by dissolving the polymer gel component of the hygroscopic material with an appropriate solvent, observing the remaining thermally conductive fillers, and then actually measuring the dimensions of optionally extracted 100 thermally conductive fillers. A method for actual measurement is not particularly limited, and the actual measurement is may be performed from an observation image obtained by using an optical microscope, a laser displacement microscope, a scanning electron microscope, or the like.

The thermally conductive filler may be subjected to a surface treatment such as a silane coupling treatment, titanate coupling treatment, an epoxy treatment, a urethane treatment, or an oxidation treatment. By performing such a surface treatment, adhesion and affinity with the polymer gel are improved, and workability such as kneading is improved.

(II) Polymer Gel

In one embodiment of the present invention, the polymer gel may contain a temperature responsive polymer whose affinity with water reversibly changes in response to temperature stimulation.

Examples of the polymer gel can include a temperature responsive polymer, a mixture containing the temperature responsive polymer, a copolymer containing the temperature responsive polymer an interpenetrating polymer network structure body containing the temperature responsive polymer, and a semi-interpenetrating polymer network structure body containing the temperature responsive polymer. Since the hygroscopic material according to an embodiment of the present invention contains a temperature responsive polymer, the temperature is chanced using a simple heating device, and with this, the moisture in the air (water vapor) can be absorbed and the absorbed water can be released in a reversible manner. From this, the hygroscopic material according to one embodiment of the present invention can be particularly suitably used for a humidity controller.

In the hygroscopic material according to one embodiment of the present invention, the polymer gel is preferably any one of the following (a) to (d):

(a) a mixture of the temperature responsive polymer with a hydrophilic polymer;
(b) a copolymer of the temperature responsive polymer and the hydrophilic polymer;
(c) an interpenetrating polymer network structure body of the temperature responsive polymer and the hydrophilic polymer; and
(d) a semi-interpenetrating polymer network structure body of the temperature responsive polymer and the hydrophilic polymer.

In one embodiment of the present invention, the polymer gel may contain components other than the temperature responsive polymer and the hydrophilic polymer as long as the effects of the present invention are not adversely affected. The shape of the hygroscopic material is not particularly limited, and may be, for example, a plate shape, a sheet shape, a film shape, a block shape, or a particle shape. The shape of the particle hygroscopic material is not particularly limited, and may be, for example, a substantially spherical shape or a bar shape. In addition, the size of the hygroscopic material according to the present invention is not specifically limited, and in a case of being used for the humidity controller, what is necessary is just to select suitably according to the structure of the humidity controller.

(Temperature Responsive Polymer Whose Affinity with Water Reversibly Changes in Response to Temperature Stimulation)

A temperature responsive polymer refers to a polymer that reversibly changes the properties thereof in response to temperature stimulation.

In addition, the affinity with water reversibly changes in response to temperature stimulation means that the polymer exposed to the temperature stimulation reversibly changes between hydrophilicity and hydrophobicity in response to the temperature stimulation.

The temperature responsive polymer can be particularly used for the humidity controller from the viewpoint that the temperature is changed using a simple heating device, and thereby the moisture in the air can be absorbed and the absorbed water can be released in a reversible manner.

The temperature responsive polymer is not particularly limited as long as it is a polymer having a lower critical solution temperature ((LCST), hereinafter, referred to as "LCST" in the present specification). A polymer having the LOST is hydrophilic at a low temperature, but becomes hydrophobic when the polymer has the LOST or higher. Here, the LOST is the temperature at which when the polymer is dissolved in water, it becomes hydrophilic at a low temperature or a boundary of the temperature in a case where the polymer becomes hydrophobic and insolubilized at above a certain temperature.

More specific examples of the temperature responsive polymer can include poly(N-alkyl (meth)acrylamide) such as poly(N-isopropyl (meth)acrylamide), poly(N-normal propyl (meth)acrylamide), poly(N-methyl (meth)acrylamide), poly(N-ethyl (meth)acrylamide), poly(N-normal butyl (meth)acrylamide), poly(N-isobutyl (meth)acrylamide), and poly(N-t-butyl (meth)acrylamide); poly(N-vinyl alkyl amide) such as poly(N-vinyl isopropyl amide), poly(N-vinyl normal propyl amide), poly(N-vinyl normal butyl amide), poly(N-vinyl isobutyl amide), and poly(N-vinyl-t-butyl amide); poly(N-vinyl pyrrolidone); poly(2-alkyl-2-oxazoline) such as poly(2-ethyl-2-oxazoline), poly(2-isopropyl-2-oxazoline), and poly(2-normalpropyl-2-oxazoline); polyvinyl alkyl ether such as polyvinyl methyl ether and polyvinyl ethyl ether; a copolymer of polyethylene oxide and polypropylene oxide; poly(oxyethylene vinyl ether); a cellulose derivative such as methyl cellulose, ethyl cellulose, hydroxypropyl cellulose, hydroxypropyl methyl cellulose; and a copolymer of the aforementioned polymers. In a case where a cellulose derivative is used as the temperature responsive polymer, it is not necessary to perform polymerization, so that it is easy to produce a hygroscopic material. In addition, the cellulose derivative is safe and biodegradable, and therefore has an advantage that the environmental load is small. In a case where the hydroxypropyl cellulose is used as the cellulose derivative, an average molecular weight of the hydroxypropyl cellulose is preferably 2,000 to 2,000,000, and similarly, a degree of substitution is preferably 1 to 3. The temperature responsive polymer is more preferably a cross-linking body of these polymers.

Note that, in one embodiment of the present invention, in a case where the temperature responsive polymer and the hydrophilic polymer forms an interpenetrating polymer network structure, both of the temperature responsive polymer and the hydrophilic polymer are all cross-linking bodies. Note that, in one embodiment of the present invention, in a case where the temperature responsive polymer and the hydrophilic polymer forms a semi-interpenetrating polymer network structure, any one of the temperature responsive polymer and the hydrophilic polymer are all cross-linking body.

In the case where the temperature responsive polymer is the cross-linking body, examples of the cross-linking body can include monomers such as N-alkyl (meth)acrylamide such as N-isopropyl (meth)acrylamide, N-normal propyl (meth)acrylamide, N-methyl (meth)acrylamide, N-ethyl (meth)acrylamide, N-normal butyl (meth)acrylamide, N-isobutyl (meth)acrylamide, and N-t-butyl (meth)acrylamide; N-vinyl alkyl amide such as N-vinyl isopropyl amide, N-vinyl normal propyl amide, N-vinyl normal butyl amide, N-vinyl isobutyl amide, and N-vinyl-t-butyl amide; vinyl alkyl ether such as vinyl methyl ether and vinyl ethyl ether; and ethylene oxide and propylene oxide; 2-alkyl-2-oxazoline such as 2-ethyl-2-oxazoline, 2-isopropyl-2-oxazoline, and 2-normal propyl-2-oxazoline, or a polymer obtained by polymerizing two or more kinds of these monomers in the presence of a cross-linking agent.

As the crosslinking agent, a conventionally known one may be appropriately selected and used, and it is possible to suitably use, for example, a crosslinkable monomer having a polymerizable functional group such as ethylene glycol di(meth)acrylate, propylene glycol di(meth)acrylate, N,N'-methylenebis(meth)acrylamide, tolylene diisocyanate, divinyl benzene, and polyethylene glycol di(meth)acrylate; glutaraldehyde; polyhydric alcohol; polyvalent amine; polyvalent carboxylic acid; and a metal ion such as a calcium ion and a zinc ion. These cross-linking agents may be used alone or two or more kinds thereof may be used in combination.

Alternatively, in a case where the temperature responsive polymer is a cross-linking body, the cross-linking body may be obtained by forming a network structure by reacting a non-crosslinking temperature responsive polymer, for example, the temperature responsive polymer exemplified above with the cross-linking agent.

(Hydrophilic Polymer)

Examples of the hydrophilic polymer include a polymer having a hydrophilic group such as a hydroxyl group, a carboxyl group, a sulfonic acid group, a phosphoric acid group, and an amino group in a side chain or a main chain. More specific examples of the hydrophilic polymer can include polysaccharide such as alginic acid and hyaluronic acid; chitosan; a cellulose derivative such as carboxymethyl cellulose, methyl cellulose, ethyl cellulose, and hydroxyethyl cellulose; poly(meth)acrylic acid, polymaleic acid, polyvinyl sulfonic acid, polyvinyl benzene sulfonic acid, polyacrylamide alkyl sulfonic acid, polydimethyl aminopropyl (meth)acrylamide, and a copolymer of these with (meth)acrylamide, hydroxyethyl (meth)acrylate, and (meth)acrylic acid alkyl ester, a composite of polydimethyl aminopropyl (meth)acrylamide and polyvinyl alcohol, a composite of polyvinyl alcohol and poly (meth)acrylic acid, poly (meth)acrylonitrile, polyallylamine, polyvinyl alcohol, polyethylene glycol, polypropylene glycol, poly (meth)acrylamide, poly-N,N'-dimethyl (meth)acrylamide, poly-2-hydroxyethyl methacrylate, poly-alkyl (meth)acrylate, polydimethyl aminopropyl (meth)acrylamide, poly (meth)acrylonitrile, and a copolymer of the polymers. The hydrophilic polymer is more preferably a cross-linking body of these.

In the hygroscopic material according to one embodiment of the present invention, the hydrophilic polymer is at least one polymer selected from the group consisting of alginic acid, hyaluronic acid, chitosan, cellulose derivatives, poly(meth)acrylic acid, polyethylene glycol, and copolymers thereof, or a cross-linking body. According to this configuration, it is possible to efficiently absorb moisture without using supercooling or a large amount of heat.

In the case where the hydrophilic polymer is the cross-linking body, examples of the cross-linking body can include polymers obtained by polymerizing monomers such as (meth)acrylic acid, allylamine, vinyl acetate, (meth)acrylamide, N,N'-dimethyl (meth)acrylamide, 2-hydroxyethyl methacrylate, alkyl (meth)acrylate, maleic acid, vinyl sulfonic acid, vinyl benzene sulfonic acid, acrylamide alkyl sulfonic acid, dimethyl aminopropyl (meth)acrylamide, and (meth)acrylonitrile in the presence of a cross-linking agent.

As the crosslinking agent, a conventionally known one may be appropriately selected and used, and it is possible to suitably use, for example, a crosslinkable monomer having a polymerizable functional group such as ethylene glycol di(meth)acrylate, propylene glycol di(meth)acrylate, N,N'-methylenebis(meth)acrylamide, tolylene diisocyanate, divinyl benzene, and polyethylene glycol di(meth)acrylate; glutaraldehyde; polyhydric alcohol; polyvalent amine; polyvalent carboxylic acid; and a metal ion such as a calcium ion and a zinc ion. These cross-linking agents may be used alone or two or more kinds thereof may be used in combination.

((a): Mixture of Temperature Responsive Polymer with Hydrophilic Polymer)

As the polymer gel, a mixture of the temperature responsive polymer with the hydrophilic polymer can be used. The ratio of the temperature responsive polymer and the hydrophilic polymer contained in the polymer gel is not particularly limited, in the ratio of the weight excluding the weight of the cross-linking agent, the hydrophilic polymer is more preferably contained by 5% by weight or more, and is still more preferably contained by 20% by weight or more, and is more preferably contained by 1,000% by weight or less, and is still more preferably contained by 700% by weight or less, with respect to the temperature responsive polymer.

((b): Copolymer of Temperature Responsive Polymer and Hydrophilic Polymer)

As the polymer gel, a copolymer of the temperature responsive polymer with the hydrophilic polymer can be used.

The ratio of the structural units constituting the temperature responsive polymer and the structural units constituting the hydrophilic polymer with respect to the total structural units contained in the polymer gel is not particularly limited, and the structural units constituting the hydrophilic polymer to the structural units constituting the temperature responsive polymer is more preferably 30% by mol or more and is still more preferably 50% by mol or more, and is more preferably 80% by mol or less and is still more preferably 70% by mol or less.

((c): Interpenetrating Polymer Network Structure Body of Temperature Responsive Polymer and Hydrophilic Polymer)

As the polymer gel, it is possible to use the interpenetrating polymer network structure body of the temperature responsive polymer and the hydrophilic polymer. Here, the interpenetrating polymer network structure means a structure in which different types of polymers are all cross-linking polymers, and the cross-linking networks of the respective polymers are entangled with each other in a state of independently existing without being chemically bonded to each other. That is, the interpenetrating polymer network structure body refers to a structure in which both of the temperature responsive polymer and the hydrophilic polymer are the cross-linking polymers, and the cross-network of the hydrophilic polymer and the cross-linking network of the temperature responsive polymer are entangled with each other in a state of independently existing without being chemically bonded to each other. When the interpenetrating polymer network structure body is used, the affinity with water clearly reversibly changes in response to the temperature stimulation as compared with the case of using the mixture or the copolymer of the temperature responsive polymer and the hydrophilic polymer. Therefore, the temperature responsive polymer can be particularly used for the humidity controller from the viewpoint that by applying the temperature stimulation, the moisture in the air can be absorbed and the absorbed water can be efficiently released.

The ratio of the temperature responsive polymer and the hydrophilic polymer contained in the polymer gel is not particularly limited, in the ratio of the weight excluding the weight of the cross-linking agent, the hydrophilic polymer is more preferably contained by 5% by weight or more, and is still more preferably contained by 20% by weight or more, and is more preferably contained by 1,000% by weight or less, and is still more preferably contained by 700% by weight or less, with respect to the temperature responsive polymer.

((d): Semi-Interpenetrating Polymer Network Structure Body of Temperature Responsive Polymer and Hydrophilic Polymer)

As the polymer gel, it is possible to use the semi-interpenetrating polymer network structure body of the temperature responsive polymer and the hydrophilic polymer. Here, the semi-interpenetrating polymer network structure means a structure in which one of the polymers having different types is a cross-linking polymer and the other one is a non-cross-linking polymer, and the respective polymers are entangled with each other in a state of independently existing without being chemically bonded to each other. That is, the semi-interpenetrating polymer network structure body of the temperature responsive polymer and the hydrophilic polymer refers to a structure in which any one of the temperature responsive polymer and the hydrophilic polymer is the cross-linking polymer and the other one is the non-cross-linking polymer, and the temperature responsive polymer and the hydrophilic polymer are entangled with each other in a state of independently existing without being chemically bonded to each other. When the semi-interpenetrating polymer network structure body is used, the affinity with water clearly reversibly changes in response to the outside stimulation as compared with the case of using the mixture or the copolymer of the temperature responsive polymer and the hydrophilic polymer. Therefore, the temperature responsive polymer can be particularly used for the humidity controller from the viewpoint that by applying the outside stimulation, the moisture in the air can be absorbed and the absorbed water can be efficiently released.

The ratio of the temperature responsive polymer and the hydrophilic polymer contained in the polymer gel is not particularly limited, in the ratio of the weight excluding the weight of the cross-linking agent, the hydrophilic polymer is more preferably contained by 5% by weight or more, and is still more preferably contained by 20% by weight or more, and is more preferably contained by 1,000% by weight or less, and is still more preferably contained by 700% by weight or less, with respect to the temperature responsive polymer.

(III) Hygroscopic Material

In the hygroscopic material according to one embodiment of the present invention, the content of the thermally conductive filler is preferably 0.1% by weight to 30% by weight, is more preferably 0.5% by weight to 30% by weight, is still more preferably 5% by weight to 25% by weight, and is most preferably 5% by weight to 20% by weight, with respect to the hygroscopic material. When the content of the thermally conductive filler is 1% by weight or more with respect to the hygroscopic material, it is possible to efficiently transfer the heat into the hygroscopic material containing the temperature responsive polymer. With this, the change in the affinity with water in response to the temperature stimulation occurs efficiently. Therefore, it is possible to realize the excellent hygroscopic material which can release the absorbed water as in a state of being liquid. Moreover, if the content of the thermally conductive filler is preferably 20 weight % or less with respect to the hygroscopic material, the hygroscopicity can be maintained even if the thermally conductive filler is added.

In addition, in the hygroscopic material according to one embodiment of the present invention, the ratio of the thermally conductive filler contained in the hygroscopic material is preferably 0.1% by weight to 30% by weight, is more preferably 0.5% by weight to 30% by weight, is still more preferably 5% by weight to 25% by weight, and is most preferably 5% by weight to 20% by weight, with respect to the dry weight of the polymer gel. If the ratio of the thermally conductive filler is preferably 5% by weight or more with respect to the dry weight of the polymer gel, the thermal conductivity becomes higher, and thus the water release properties of the absorbed moisture can be improved. If the ratio of the thermally conductive filler is preferably 25% by weight or less, it is possible to maintain the hygroscopicity.

In the hygroscopic material according to one embodiment of the present invention, the orientation of the thermally conductive filler is preferably a direction perpendicular to the surface of the hygroscopic material that receives heat from a heat source. Specifically, the orientation of the thermally conductive filler is preferably in the direction indicated by the arrow in FIG. 1. The hygroscopic material may be in direct contact with the heat source or may not be in direct contact with the heat source. The method of orienting the thermally conductive filler in the direction indicated by the arrow in FIG. 1 is not particularly limited, and any method may be used. For example, the thermally conductive filler can be oriented by applying a magnetic field or an electric field. According to the structure, the moisture contained in the hygroscopic material can be efficiently released. It is preferable that the thermally conductive filler is uniformly dispersed in the polymer gel. With this configuration, the hygroscopic material can be uniformly thermal-conducted without locally becoming high temperature, and efficiently release water.

The method of adding the thermally conductive filler to the polymer gel is not particularly limited as long as the thermally conductive filler can be uniformly and stably dispersed. Specifically, for example, it may be a method of producing the polymer gel after mixing the thermally conductive filler into the solution containing a monomer constituting the temperature responsive polymer, a monomer constituting the hydrophilic polymer, a hydrophilic polymer, and/or a temperature responsive polymer. In addition, it may be a method of performing a surface treatment on the thermally conductive filler and then mixing the thermally conductive filler surface-treated with the solution containing a monomer constituting the temperature responsive polymer, a monomer constituting the hydrophilic polymer, a hydrophilic polymer, and/or a temperature responsive polymer.

The shape of the hygroscopic material according to one embodiment of the present invention is not particularly limited, and may be a plate shape, a sheet shape, a film shape, and a particle shape. The shape of the particle hygroscopic material is not particularly limited, and may be, for example, a substantially spherical shape or a plate shape. In addition, the size of the hygroscopic material according to the present invention is not specifically limited, and in a case of being used for the humidity controller, what is necessary is just to select suitably according to the structure of the humidity controller.

The polymer gel is preferably a dried body. The hygroscopic material can absorb moisture in the air in a case where the polymer gel is a dried body. The polymer gel is preferably a dried body dried by, for example, reduced pressure (vacuum) drying, thermal drying, natural drying, and a combination thereof, and is more preferably a dried body dried by reduced pressure drying or thermal drying. By reduced pressure drying or thermal drying, the polymer gel can form a dried body of the polymer gel having a dense network structure with fine pores occurring when the solvent used for polymerization is sublimated and exits to the outside. Since the polymer gel having a dense network structure has a large area in contact with air, the amount to absorb the moisture in the air is increased.

A degree of pressure reduction in a case of drying by the reduced pressure drying is preferably 10 Pa to 100 Pa, and is more preferably 20 Pa to 50 Pa.

The reduced pressure drying is more preferably lyophilization performed after the polymer gel is frozen. By reduced pressure drying after the polymer gel is frozen, the polymer gel can form a dried body of the polymer gel having a denser network structure with fine pores occurring when the solvent used for polymerization is sublimated and exits to the outside. A freezing temperature is preferably $-20°$ C. to $-60°$ C., and is more preferably $-30°$ C. to $-60°$ C. drying time is preferably 20 hours or longer, and is more preferably 30 hours or longer. The upper limit of the drying time is preferably about 50 hours.

Note that, in one embodiment of the present invention, the dried body of the polymer gel does not need to have moisture completely removed from the polymer gel, but may contain moisture as long as it can absorb the moisture in the air. Therefore, the moisture content of the dried body of the polymer is not particularly limited as long as the dried body can absorb the moisture in the air, and for example, it is preferably 20% by weight to 30% by weight and is more preferably 10% by weight to 25% by weight. Here, the moisture content refers to the ratio of the moisture to the dry weight of the polymer gel.

The description regarding the dried body relates to the polymer gel, but the same applies to the hygroscopic material.

Embodiment 2: Method of Producing Hygroscopic MATERIAL

A method of producing the hygroscopic material according to one embodiment of the present invention is a method of producing a hygroscopic material containing a polymer gel containing a temperature responsive polymer whose affinity with water reversibly changes in response to temperature stimulation and a thermally conductive filler.

The method of producing the hygroscopic material in one embodiment of the present invention may include at least a thermally conductive filler-containing gel production step of producing a polymer gel containing the temperature responsive polymer and a thermally conductive filler-containing gel containing the thermally conductive filler, and a drying step of drying the thermally conductive filler-containing gel obtained in the thermally conductive filler-containing gel production step. The method further includes a pulverization step of pulverizing the dried body of the thermally conductive filler-containing gel dried at the drying step.

Hereinafter, each step for configuring the method of producing the hygroscopic material according to one embodiment of the present invention will be described. However, the description which overlaps with the content described in the hygroscopic material mentioned above will not be repeated.

(Thermally Conductive Filler-Containing Gel Production Step)

A thermally conductive filler-containing gel production step is not particularly limited as long as it is a step of producing a thermally conductive filler-containing gel containing a polymer gel containing the temperature responsive polymer and the thermally conductive filler. Hereinafter, the present step will be described with reference to examples of a case where the polymer gel is an interpenetrating polymer network structure body of the temperature responsive polymer and the hydrophilic polymer, and a case where the polymer gel is a semi-interpenetrating polymer network structure body of the temperature responsive polymer and the hydrophilic polymer. The thermally conductive filler-containing gel can be produced by, for example, the following method.

[1] A method including a step (i) of mixing a monomer constituting the temperature responsive polymer with the thermally conductive filler; a step (ii) of forming a cross-linking network (a) of the cross-linking body of the temperature responsive polymer containing the thermally conductive filler by polymerizing and crosslinking the monomer constituting the temperature responsive polymer containing the thermally conductive filler, obtained in the step (i); a step (iii) of mixing the monomer constituting the hydrophilic polymer with the thermally conductive filler; and a step (iv) of forming an interpenetrating polymer network structure formed of the cross-linking network (a) containing the thermally conductive filler and a cross-linking network (b) of the cross-linking body of the hydrophilic polymer containing the thermally conductive filler by polymerizing and crosslinking, under the presence of the cross-linking network. (a), the monomer constituting the hydrophilic polymer containing the thermally conductive filler, obtained in the step (iii).

[2] A method including a step (i) of mixing a monomer constituting the temperature responsive polymer with the thermally conductive filler; a step (ii) of forming a cross-linking network (a) of the cross-linking body of the temperature responsive polymer containing the thermally conductive filler by polymerizing and crosslinking the monomer constituting the temperature responsive polymer containing the thermally conductive filler, obtained in the step (i); a step of polymerizing a monomer constituting the hydrophilic polymer under the presence of the cross-linking network (a); a step (iv) of mixing the polymer obtained in step (iii) with the thermally conductive filler; and a step (v) of forming an interpenetrating polymer network structure formed of the cross-linking network (a) containing the thermally conductive filler and a cross-linking network (b) of the cross-linking body of the hydrophilic polymer containing the thermally conductive filler by crosslinking the polymer containing the thermally conductive filler, obtained in the step (iv).

[3] A method including a step (i) of polymerizing a monomer constituting the temperature responsive polymer; a step (ii) of mixing the temperature responsive polymer obtained in the step (i) with the thermally conductive filler; a step (iii) of forming a cross-linking network (a) of the cross-linking body of the temperature responsive polymer containing the thermally conductive filler by crosslinking the temperature responsive polymer containing the thermally conductive filler obtained in the step (ii); a step (iv) of mixing the monomer constituting the hydrophilic polymer with the thermally conductive and a step (v) of forming an interpenetrating polymer network structure formed of the cross-linking network (a) and a cross-linking network (b) of the cross-linking body of the hydrophilic polymer containing the thermally conductive filler by polymerizing and crosslinking, under the presence of the cross-linking network (a), the monomer constituting the hydrophilic polymer containing the thermally conductive filler, obtained in the step (iv).

[4] A method including a step (i) of polymerizing a monomer constituting the temperature responsive polymer; a step (ii) of mixing the temperature responsive polymer obtained in the step (i) with the thermally conductive filler; a step (iii) of forming a cross-linking network (a) of the cross-linking body of the temperature responsive polymer containing the thermally conductive filler by crosslinking the temperature responsive polymer containing the thermally conductive filler obtained in the step (ii); a step (iv) of polymerizing a monomer constituting the hydrophilic polymer under the presence of the cross-linking network (a); a step (v) of mixing the polymer obtained in step (iv) with the thermally conductive filler; and a step (vi) of forming an interpenetrating polymer network structure formed of the cross-linking network (a) containing the thermally conductive filler and a cross-linking network (b) of the cross-linking body of the hydrophilic polymer containing the thermally conductive filler by crosslinking the hydrophilic polymer containing the thermally conductive filler, obtained in the step (v).

[5] A method including a step (i) of mixing a monomer constituting the temperature responsive polymer with the thermally conductive filler; a step (ii) of forming a cross-linking network (a) of the cross-linking body of the temperature responsive polymer containing the thermally conductive filler by polymerizing and crosslinking the monomer constituting the temperature responsive polymer containing the thermally conductive filler, obtained in the step (i); a step (iii) of mixing the monomer constituting the hydrophilic polymer with the thermally conductive filler; and a step (iv) of forming a semi-interpenetrating polymer network structure formed of the cross-linking network (a) containing the thermally conductive filler and the hydrophilic polymer containing a non-cross-linking thermally conductive filler by polymerizing, under the presence of the cross-linking network (a), the monomer constituting the hydrophilic polymer containing the thermally conductive filler, obtained in the step (iii).

A method including a step (i) of polymerizing a monomer constituting the temperature responsive polymer; a step (ii) of mixing the temperature responsive polymer obtained in the step (i) with the thermally conductive filler; a step (iii) of forming a cross-linking network (a) of the cross-linking body of the temperature responsive polymer contain the thermally conductive filler by crosslinking the temperature responsive polymer containing the thermally conductive filler obtained in the step (ii);

a step (iv) of mixing the monomer constituting the hydrophilic polymer with the thermally conductive filler; and a step (v) of forming a semi-interpenetrating polymer network structure formed of the cross-linking network (a) containing the thermally conductive filler and the hydrophilic polymer containing a non-cross-linking thermally conductive filler by polymerizing, under the presence of the cross-linking network (a), the monomer constituting the hydrophilic polymer containing the thermally conductive filler, obtained in the step (iv).

A method including a step (i) of mixing a monomer constituting the temperature responsive polymer with the thermally conductive filler; a step (ii) of producing non-cross-linking temperature responsive polymer containing the thermally conductive filler by polymerizing the monomer constituting the temperature responsive polymer containing the thermally conductive filler, obtained in the step (i);

a step (iii) of mixing the monomer constituting the hydrophilic polymer with the thermally conductive filler; and a step (iv) of forming a semi-interpenetrating polymer network structure formed of the non-cross-linking temperature responsive polymer containing the thermally conductive filler and a cross-linking network (b) of the cross-linking body of the hydrophilic polymer containing the thermally conductive filler by polymerizing and crosslinking, under the presence of the non-cross-linking temperature responsive polymer containing the thermally conductive filler, the monomer constituting the hydrophilic polymer containing the thermally conductive filler, obtained in the step (iii).

[8] A method including a step (i) of mixing a monomer constituting the temperature responsive polymer with the thermally conductive filler; a step (ii) of producing non-cross-linking temperature responsive polymer containing the thermally conductive filler by polymerizing the monomer constituting the temperature responsive polymer containing the thermally conductive filler, obtained in the step (i);

a step (iii) of polymerizing the monomer constituting the hydrophilic polymer under the presence of the non-cross-linking temperature responsive polymer containing the thermally conductive filler; a step (iv) of mixing the hydrophilic polymer obtained in the step with the thermally conductive filler; a step (v) of forming a semi-interpenetrating polymer network structure formed of the non-cross-linking temperature responsive polymer containing the thermally conductive filler and a cross-linking network (b) of the cross-linking body of the hydrophilic polymer containing the thermally conductive filler by crosslinking the hydrophilic polymer containing the thermally conductive filler obtained in the step (iv).

Note that, in the methods of the above [1] to [8], the interpenetrating polymer network structure of the hydrophilic polymer containing the thermally conductive filler and the temperature responsive polymer containing the thermally conductive filler or the semi-interpenetrating polymer network structure is formed; however, one having no thermally conductive filler may be used as one of the hydrophilic polymer and the temperature responsive polymer.

Regarding the mixture of the temperature responsive polymer with the hydrophilic polymer and the copolymer of the temperature responsive polymer and the hydrophilic polymer, similarly, the thermally conductive filler may be mixed into a monomer or a polymer solution before cross-linking.

In the above methods, a polymerization method of polymerizing the monomer is not particularly limited, and radical polymerization, ionic polymerization, polycondensation, ring-opening polymerization and the like can be suitably used. Further, the solvent used for the polymerization may be appropriately selected according to the monomer. For example, water, phosphate buffer, Tris buffer, acetate buffer, methanol, ethanol, and the like can be suitably used.

The polymerization initiator is not particularly limited, and for example, persulfate such as ammonium persulfate and sodium persulfate; hydrogen peroxide; peroxides such as t-butyl hydroperoxide and cumene hydroperoxide, azo-bisisobutyronitrile, and benzoyl peroxide can be suitably used. Among these polymerization initiators, in particular, an initiator exhibiting the oxidizing properties such as persulfate and peroxides can also be used as a redox initiator such as sodium bisulfite and N,N,N',N'-tetramethyl ethylenediamine. Also, light, a radiation, or the like may be used as an initiator.

The polymerization temperature is not particularly limited, and is usually 5° C. to 80° C. The polymerization time is not particularly limited, and is usually 4 hours to 48 hours.

In the polymerization, the concentration of the monomer, the cross-linking agent, and the like is not particularly limited as long as the temperature responsive polymer, the hydrophilic polymer, or the cross-linking body thereof can be obtained. Further, the concentration of the polymerization initiator is not particularly limited and may be appropriately selected.

In the methods of the above [1] to [3], [5], and [7], the method of forming the cross-linking network of the cross-linking body of the temperature responsive polymer containing the thermally conductive filler or the hydrophilic polymer containing the thermally conductive filler by polymerizing and crosslinking the monomer may be a method of polymerizing the monomer under the presence of the cross-linking agent, or a method of polymerizing the monomer to make a polymer and then crosslinking the polymer with the cross-linking agent.

In the step (iv) of the above [1], [5], and [7], the polymerization conditions or the crosslinking conditions may be appropriately set so that no crosslinking is formed between the polymers formed in the step (ii) or the cross-linking bodies thereof. In the step (v) of the above [2], the polymerization conditions or the crosslinking conditions may be appropriately set so that no crosslinking is formed between the polymers formed in the step (ii) or the cross-linking bodies thereof. Further, in the step of the above [3] and [6], the polymerization conditions or the crosslinking conditions may be appropriately set so that no crosslinking is formed between the polymers formed in the step (iii) or the cross-linking bodies thereof. Further, in the step (vi) of the above [4], the polymerization conditions or the cross-linking conditions may be appropriately set so that no crosslinking is formed between the polymers formed in the step (iii) or the cross-linking bodies thereof. In the step (v) of the above [8], the polymerization conditions or the crosslinking conditions may be appropriately set so that no crosslinking is formed between the polymers formed in the step (ii) or the cross-linking bodies thereof.

In the methods of the above [1] to [8], the monomer constituting the temperature responsive polymer, the monomer constituting the hydrophilic polymer, and the cross-linking agent are as described in the above (I).

In addition, in the methods of the above [1] to [8], in a case where the temperature responsive polymer or the hydrophilic polymer is, for example, a polymer such as a cellulose derivative or polysaccharides from the beginning, the phrase "polymerizing and crosslinking the monomer constituting the temperature responsive polymer" is to be read as "crosslinking the temperature responsive polymer" and the phrase "polymerizing and crosslinking the monomer constituting the hydrophilic polymer" is to be read as "crosslinking the hydrophilic polymer".

In addition, in the methods of the above [1] to [8], after producing the temperature responsive polymer or the cross-linking body thereof, under the presence of the obtained temperature responsive polymer or the cross-linking body thereof, the hydrophilic polymer or the cross-linking body thereof is produced; however, after producing the hydrophilic polymer or the cross-linking body thereof, under the presence of the obtained hydrophilic polymer or the cross-linking body thereof, the temperature responsive polymer or the cross-linking body thereof may be produced.

In addition, in the methods of the above [I] to [8], the interpenetrating polymer network structure or the semi-interpenetrating polymer network structure is produced in a two-step process in which the temperature responsive polymer or the cross-linking body thereof is produced, and then under the presence of the obtained temperature responsive polymer or the cross-linking body thereof, the hydrophilic polymer or the cross-linking body thereof is produced; however, the temperature responsive polymer or the cross-linking body thereof and the hydrophilic polymer or the cross-linking body thereof can be produced simultaneously in one step by selecting the polymerization conditions and the crosslinking conditions such that crosslinking is not formed between the temperature responsive polymer or the cross-linking body thereof and the hydrophilic polymer or the cross-linking body thereof. For example, by using different combinations of the polymerization method using for producing the temperature responsive polymer or the cross-linking body thereof and the cross-linking agent and the polymerization method using for producing the hydrophilic polymer or the cross-linking body thereof and the cross-linking agent, it is possible to produce the polymer gel in the one step process, (Drying Step)

In a drying step, the thermally conductive filler-containing gel obtained in the thermally conductive containing gel production step is dried to obtain a dried body of the thermally conductive filler-containing gel.

The method of drying the thermally conductive filler-containing gel is not particularly limited, and a known method in the related art can be appropriately used. Examples of the method of drying the thermally conductive filler-containing gel include drying by heating, drying under reduced pressure, lyophilization, and solvent replacement.

(Pulverization Step)

The dried body of the thermally conductive filler-containing gel obtained by the drying step is pulverized in the pulverization step as necessary.

The pulverization method is not particularly limited. For example, the dried body of the thermally conductive filler-containing gel is pulverized by using a mechanical pulverizer such as a rotor, a ball mill, an airflow pulverizer, or the like, and it can be further classified into a particulate hygroscopic material as necessary.

In addition, the particulate hygroscopic material can also be produced by synthesizing thermally conductive filler-containing gel particles by using emulsion polymerization in the thermally conductive filler-containing gel production step.

Embodiment 3: Humidity Controller

The hygroscopic material according to one embodiment of the present invention can reversibly absorb moisture in the air and release the absorbed moisture, and thus can be particularly preferably used in the humidity controller. According to the humidity controller using the hygroscopic material, humidity can be adjusted efficiently without using supercooling or a large amount of heat. Therefore, the humidity controller using the hygroscopic material according to one embodiment of the present invention is also included in the present invention. Hereinafter, the humidity controller according to one embodiment of the present invention will be described. The humidity controller according to one embodiment of the present invention is provided with a polymer gel containing a temperature responsive polymer whose affinity with water reversibly changes in response to the temperature stimulation, a hygroscopic material containing a thermally conductive filler, and a stimulation applying unit that applies temperature stimulation for reducing the affinity of the temperature responsive polymer with water. Regarding the hygroscopic material, the description which overlaps with the content described in [Embodiment 1] mentioned above will not be repeated.

The humidity controller according to one embodiment of the present invention is provided with a humidity controller main body including an intake port and an exhaust port. The inside of the humidity controller main body is provided with a plurality of humidity control units carrying the hygroscopic material of the present invention; a humidity control area, which is a region where the humidity control unit absorbs moisture in air, a dehydration area which is an area where the humidity control unit that absorbs moisture from the air releases the absorbed moisture as water; a drainage tank for storing released water; and a blower fan that takes in air that is absorbed from the intake port and exhausts the air that is absorbed from the exhaust port. Note that, in the present embodiment, as a hygroscopic material, a hygroscopic material containing a polymer gel containing a temperature responsive polymer whose affinity with water reversibly changes in response to temperature stimulation, and a thermally conductive filler.

The plurality of humidity control units can move between the humidity control area and the dehydration area. The dehydration area is provided with the stimulation applying unit that applies the temperature stimulation for reducing the affinity of the temperature responsive polymer with water. The stimulation applying unit is, for example, a heater.

When the air (humid air) suctioned into the humidity controller passes through the humidity control area, it comes into contact with the hygroscopic material of the humidity control unit. The hygroscopic material that is hydrophilic at room temperature absorbs the moisture in the air (humid air), and thereby the humid air is absorbed when passing through the humidity control area, and the absorbed air (dry air) is exhausted from the exhaust port.

The humidity control unit that has absorbed the moisture in the air (humid air) moves from the humidity control area to the dehydration area. In the dehydration area, the humidity control unit that has moved to the dehydration area controls the hygroscopic material to be hydrophobic by subjecting temperature stimulation to the hygroscopic material with the stimulation applying unit. As a result, the moisture absorbed by the hygroscopic material is released as water from the hygroscopic material. The released water is discharged to the drainage tank.

At this time, since the polymer hygroscopic material contains the filler, the humidity controller according to one embodiment of the present invention has high thermal conductivity and is excellent in the water release properties.

However, the present invention is not limited to the above-described embodiments, various modifications can be made within the scope described in claims, and embodiments obtained by appropriately combining technical means disclosed in different embodiments are also included in the technical scope of the present invention. Furthermore, new technical features can be formed by combining the technical means disclosed in the respective embodiments.

SUMMARY

The hygroscopic material of a first aspect of the present invention is configured to contain a polymer gel containing a temperature responsive polymer whose affinity with water reversibly changes in response to temperature stimulation and a thermally conductive filler.

According to the configuration, an effect of realizing a hygroscopic material that has high thermal conductivity and excellent water release properties is exhibited.

In the hygroscopic material of a second aspect of the present invention, according to the first aspect, the content of the thermally conductive filler may be 0.1% by weight to 30% by weight with respect to the hygroscopic material.

According to the configuration, an effect of realizing a hygroscopic material that controls the thermal conductivity while maintaining hygroscopicity and has the excellent water release properties is exhibited.

In the hygroscopic material of a third aspect of the present invention, according to the first and second aspects, the thermally conductive filler may be oriented in a direction perpendicular to the surface of the hygroscopic material that receives heat from a heat source.

According to the configuration, an effect of efficiently releasing the moisture contained in the hygroscopic material is exhibited.

In the hygroscopic material of a fourth aspect of the present invention, according to any one of the above first to third aspects, the thermally conductive filler may be at least one thermally conductive filler selected from the group consisting of a carbonaceous material, a metal particle, a metal oxide, a metal hydroxide, a nitrogen compound, a carbon compound, ceramics, and cellulose.

According to the configuration, an effect of efficiently releasing the moisture contained in the hygroscopic material is exhibited.

In the hygroscopic material of a fifth aspect of the present invention, according to any one of the above first to fourth aspects, the polymer gel may be any one of the following (a) to (d):
(a) a mixture of the temperature responsive polymer with a hydrophilic polymer;
(b) a copolymer of the temperature responsive polymer and the hydrophilic polymer;
(c) an interpenetrating polymer network structure body of the temperature responsive polymer and the hydrophilic polymer; and
(d) a semi-interpenetrating polymer network structure body of the temperature responsive polymer and the hydrophilic polymer.

According to the above configuration, an effect of directly taking out the absorbed water in a liquid state by only heating the hygroscopic material having absorbed the moisture in the air is exhibited.

EXAMPLES 1 TO 3 AND COMPARATIVE EXAMPLE 1

Example 1: Production of Hygroscopic Material Containing Alg/HPC Semi-Interpenetrating Polymer Network Structure Body and Single Wall CNT 100 mg of sodium alginate (Alg) and 100 mg of hydroxypropyl cellulose (HPC) (Wako Pure Chemical Industries, Ltd., hydoxypropyl cellulose 150 to 400 cP) were dissolved in 400 ml of ultrapure water to obtain an Alg/HPC solution. In the obtained Alg/HPC solution, single wall carbon nanotube (produced by Meijo Nano Carbon., eDIPS-iNK) was added and mixed so that the single wall carbon nanotube (Single wall CN) was 0.5% by weight with respect to the total weight of Alg and HPC. A mixture of Alg/HPC semi-interpenetrating polymer network structure body and Single wall CNT was obtained by adding 300 mL of 1 M calcium chloride aqueous solution to the obtained mixture and allowing to stand for 24 hours. The obtained mixture was frozen at −30° C. and dried under a reduced pressure of 20 Pa for 30 hours to obtain a dried body (hydroscopic material 1) of a mixture of the Alg/HPC semi-interpenetrating polymer network structure body and Single wall CNT.

Example 2

A dried body (hygroscopic material 2) of the mixture of the Alg/HPC semi-interpenetrating polymer network structure body and the Single wall CNT was obtained in the same manner as in Example 1 except that the amount of Single wall CNT added to the Alg/HPC solution was 1% by weight with respect to the total weight of Alg and EPC.

Example 3

A dried body (hygroscopic material 3) of the mixture of the Ala/HPC semi-interpenetrating polymer network structure body and the Single wall CNT was obtained in the same manner as in Example 1 except that the amount of Single wall CNT added to the Alg/HPC solution was 5% by weight with respect to the total weight of Alg and HPC.

Comparative Example 1: Synthesis of Alg/HPC Semi-Interpenetrating Polymer Network Structure Body A dried body (comparative hygroscopic material 1) of Alg/HPC semi-interpenetrating polymer network structure body was obtained in the same manner as in Example 1 except that Single wall CNT was not added to the Alg/HPC solution.

<Thermal Conductivity Evaluation of Hygroscopic Material>

The hygroscopic materials 1 to 3 and the comparative hygroscopic material 1 were heated in a 30° C. environment and at a constant temperature of 50° C. of a heater and the temperature change of the hygroscopic material were measured over time so as to evaluate thermal conductivity of the hygroscopic material. In addition, as the hygroscopic materials 1 to 3 and the comparative hygroscopic material 1 used for the evaluation, those not hygroscopic were used.

Figure 2:
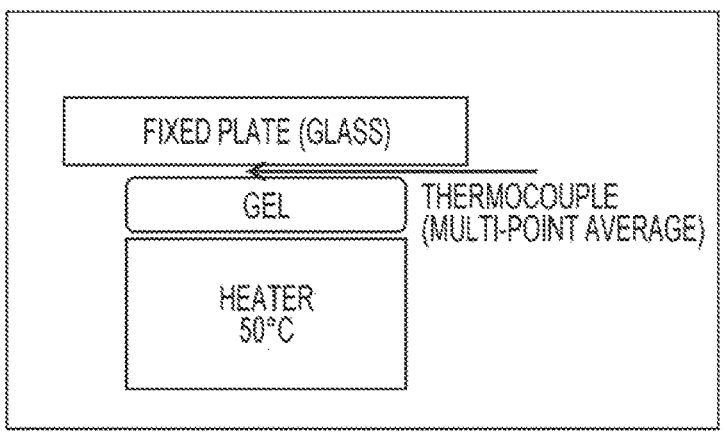
FIG. 2 is a schematic view of an apparatus for measuring thermal conduction of the hygroscopic material in examples of the present invention.

FIG. 2 illustrates an apparatus used for evaluating the thermal conductivity of the hygroscopic material. The hygroscopic material was directly placed on the heater, and a glass plate was placed on the hygroscopic material as a fixed plate. The temperature of the surface of the hygroscopic material opposite to the surface of the hygroscopic material in contact with the heater, that is, a plurality of points on the surface of the hygroscopic material in contact with the glass plate was measured with a thermocouple, the average temperature at those points of time was set as the temperature at that time.

Figure 3:
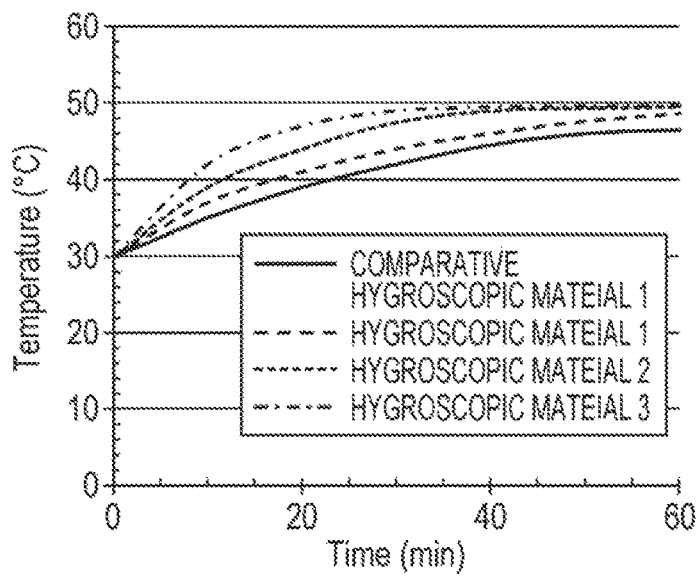
FIG. 3 is a diagram illustrating an evaluation result of the thermal conduction of the hygroscopic material in examples of the present invention.

FIG. 3 illustrates time-temperature. In FIG. 1, vertical axis indicates temperature (unit: ° C.), and a horizontal axis indicates time (unit: minutes). As illustrated in FIG. 3, the higher the ratio of the Single wall CNT contained in the hygroscopic materials 1 to 3 and the comparative hygroscopic material 1 to the total weight of Alp and NEC contained in the hygroscopic material, the faster the temperature rises, and the ultimate temperature was increased, thereby improving the thermal conductivity.

EXAMPLES 4 TO 6 AND COMPARATIVE EXAMPLE 2

Example 4

A dried body (hygroscopic material 1) of the mixture of Alg/HPC semi-interpenetrating polymer network structure body and the Single wall CNT was obtained in the same manner as in Example 1.

Example 5

A dried body (hygroscopic material 2) of the mixture of Alg/HPC semi-interpenetrating polymer network structure body and the Single wall CNT was obtained in the same manner as in Example 2.

Example 6

A dried body (hygroscopic material 3) of the mixture of Alg/HPC semi-interpenetrating polymer network structure body and the Single wall CNT was obtained in the same manner as in Example 3.

Comparative Example 2

A dried body (comparative hygroscopic material 1) of the Alg/HPC semi-interpenetrating polymer network structure body was obtained in the same manner as in Comparative Example 1.

<Evaluation of Hygroscopic Behavior of Hygroscopic Material>

The hygroscopic materials 1 to 3 and comparative hygroscopic material 1 are allowed to stand under a constant temperature and humidity condition of a temperature of 25° C. and a humidity of 80% RH, and the weight change over time was measured to investigate the hygroscopic behavior of these hygroscopic materials.

FIG. 4 illustrates the time-moisture absorption rate. In FIG. 4, the vertical axis indicates the moisture content (in FIG. 4, "Amount of moisture absorption". In other words, the moisture content is the amount of moisture absorbed in the air. Unit: g/g-dried body (indicated as "g/g-dried gel" in FIG. 4)), and the horizontal axis indicates time (unit: time). As illustrated in FIG. 4, the higher the ratio of the Single wall CNT contained in the hygroscopic material to the total weight of Alg and HPC contained in the hygroscopic material, the faster the moisture absorption rate. Further, the hygroscopic materials 1 to 3 had a moisture absorption amount of 0.9 g/g-dried body or more even when the Single wall CNT was contained.

INDUSTRIAL APPLICABILITY

The hygroscopic material according to the present invention is very useful as a hygroscopic material, and can be suitably used for a humidity controller.

The invention claimed is:

1. A hygroscopic material comprising:
a polymer gel containing a temperature responsive polymer whose affinity with water reversibly changes in response to temperature stimulation; and
a thermally conductive filler,
wherein a content of the thermally conductive filler is 0.1% by weight to 30% by weight with respect to the hygroscopic material.

2. A hygroscopic material comprising:
a polymer gel containing a temperature responsive polymer whose affinity with water reversibly changes in response to temperature stimulation; and
a thermally conductive filler,
wherein the thermally conductive filler is oriented in a direction perpendicular to a surface of the hygroscopic material that receives heat from a heat source.

3. The hygroscopic material according to claim 1,
wherein the thermally conductive filler is oriented in a direction perpendicular to a surface of the hygroscopic material that receives heat from a heat source.

4. The hygroscopic material according to claim 1,
wherein the thermally conductive filler is at least one thermally conductive filler selected from a group consisting of a carbonaceous material, a metal particle, a metal oxide, a metal hydroxide, a nitrogen compound, a carbon compound, ceramics, and cellulose.

5. The hygroscopic material according to claim 1,
wherein the polymer gel is any one of the following (a) to (d):
(a) a mixture of the temperature responsive polymer with a hydrophilic polymer;
(b) a copolymer of the temperature responsive polymer and the hydrophilic polymer;
(c) an interpenetrating polymer network structure body of the temperature responsive polymer and the hydrophilic polymer; and
(d) a semi-interpenetrating polymer network structure body of the temperature responsive polymer and the hydrophilic polymer.

* * * * *